UNITED STATES PATENT OFFICE.

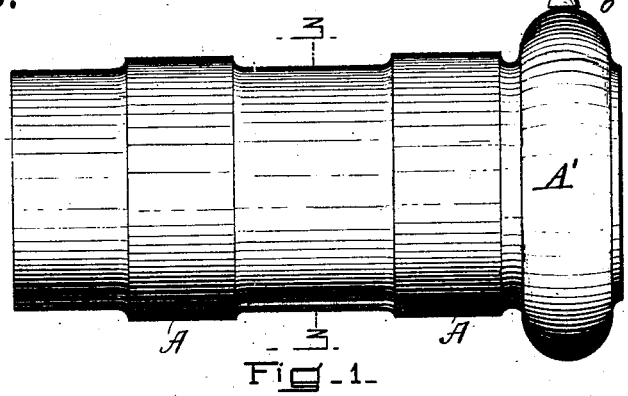
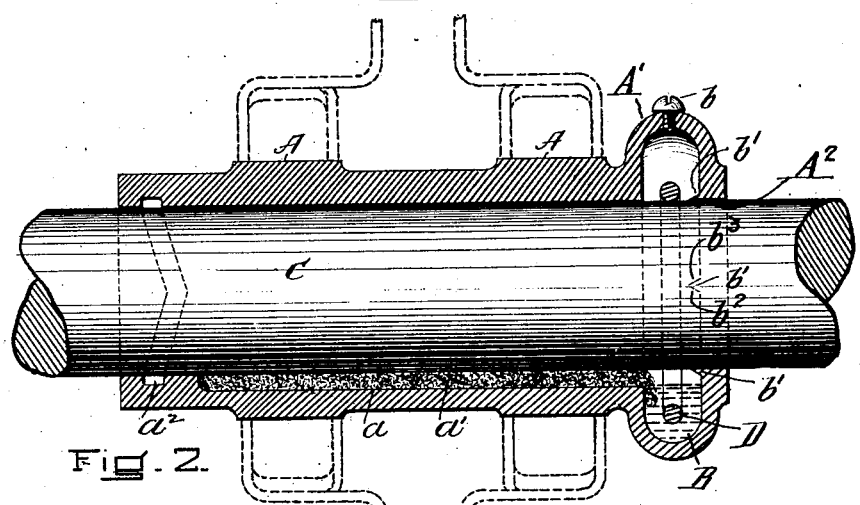
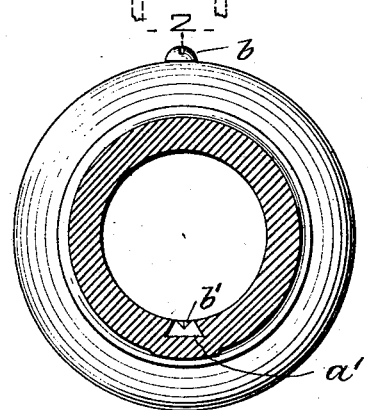

DANIEL G. LANGLANDS, OF BOSTON, MASSACHUSETTS.

BUSHING.

No. 907,695.　　　　Specification of Letters Patent.　　　Patented Dec. 22, 1908.

Application filed March 20, 1907. Serial No. 363,512.

*To all whom it may concern:*

Be it known that I, DANIEL G. LANGLANDS, of Boston, in the county of Suffolk and State of Massachusetts, a citizen of the United States, have invented a new and useful Improvement in Bushings, of which the following is a specification.

My invention relates to an improvement in bushings especially adapted for sectional pulleys and is more especially adapted to loose pulleys where it is necessary that there shall be a thorough lubrication of the shaft which passes through the bushing and where also it is desirable that not only shall the means of lubrication be such that the lubricator need be renewed infrequently, but also that the chance for the dripping or leakage shall be reduced to a minimum.

The special object of my invention is to provide a self-oiling bushing of integral structure, or in other words, a one-piece, self-oiling bushing which can be easily and economically made and will in its unitary structure possess the following advantages, viz: that of providing a very large interior bearing surface; of being made comparatively light; will have no parts to shake loose causing loss of oil, wear and shortening the life of the bushing, and will also be self-acting not only to keep the oil within the bushing but to cause a distribution or circulation of the oil throughout the bushing.

My invention will be understood by reference to the drawings, in which—

Figure 1 is an elevation of a bushing embodying my invention; Fig. 2 being a vertical section on line 2—2 of Fig. 3, showing also the shaft within the bushing, and Fig. 3 is a cross section on line 3—3 of Fig. 1.

As may be seen from the drawings, the bushing comprises in a one-piece structure a main bearing section A and at the end thereof a section $A^1$ forming an oil chamber B.

C is the shaft on which the bushing is arranged. The section A of the bushing consists simply of a sleeve fitting snugly around the shaft C and providing a large interior bearing surface. The exterior of this portion of the bushing may be of any desired shape to receive a pulley or other part applied to it.

In Fig. 2 there is shown in dotted lines a conventionalized portion of a pulley mounted upon the bushing.

The section $A^1$ of the bushing is made hollow to form the oil chamber B around the shaft C. The outer side or face $A^2$ of this section forming the end of the bushing is made to present an auxiliary bearing for the shaft C, and it is to be noted that by reason of the integral connection of this part $A^2$ with the main body of the bushing the part may easily be formed to present a true auxiliary bearing for the shaft.

The oil well B is provided with an opening in the section $A^1$ for admitting the oil. This opening is closed by a screw $b$. Under ordinary conditions the level of the oil in the oil chamber should be sufficiently low so as not to come in contact with the surface of the shaft C.

For the purpose of bringing the oil in contact with the shaft C a ring D may be used. This ring rides on the shaft as the shaft rotates, being carried around by it more or less, and as the ring turns it carries up oil onto the shaft which oil spreads along the shaft through the bushing. I prefer, however, for the purpose of oiling the bushing from the oil well B to provide the interior of the main bearing section or sleeve A with a longitudinally extending groove $a$ in which is a piece of felt $a^1$ the end of which preferably dips into the oil in the oil well so as to keep the strip saturated by capillary attraction.

At the end of the main bearing section of the bushing beyond the longitudinally-extending groove $a$ containing the felt or fibrous material by which the oil is applied to the shaft I provide a groove $a^2$ having an edge or edges extending in an oblique direction to the axis of the shaft as I have found that a groove with an edge so extending not only acts to prevent the oil creeping outwardly along the shaft and escaping from the bushing, but by reason of the oblique inclination of the edge or edges of this groove the oil is forced back along the shaft in the direction of the oil chamber. I prefer to so make the groove that its edge or edges will extend in a zigzag direction when the same effect is obtained as above noted whatever the direction in which the bushing or shaft may be turned. At the other end of the bushing within the chamber of the oil-carrying section there are provided upon the interior of the outer wall of this section wipers $b^1$. These wipers are preferably integrally formed as a part of the bushing and extend inwardly from the wall bearing the same in the direction of the axis of the shaft, cooperating therewith to scrape or wipe the oil directed along the shaft as above noted and restore it to the oil well. It will be seen that the wipers are made angular in form with edges $b^2$, $b^3$ at an oblique angle to the axis of the shaft so that the oil scraped from the shaft may be guided, as it were, back along the shaft towards the interior of the bushing and as it accumulates on the shaft drop into the oil-well.

What I claim as my invention is:—

1. A bushing of the character specified having a main bearing section and an oil-carrying section through both of which sections a shaft may extend, said main bearing section having formed therein means whereby oil applied to said shaft may be kept from escaping from said bushing and directed along said shaft towards the oil-carrying section thereof, means whereby oil in the well of said oil-carrying section of said bushing may be applied to said shaft, and means adapted to wipe the oil from said shaft and restore it to the well of said oil-carrying section.

2. A bushing of the character specified having a main bearing section and an oil-carrying section through both of which sections a shaft may extend, said main bearing section having formed therein means whereby oil applied to said shaft may be kept from escaping from said bushing and directed along said shaft towards the oil-carrying section thereof, means whereby oil in the well of said oil-carrying section of said bushing may be applied to said shaft, and wipers located upon the interior wall of said oil-carrying section and extending inwardly therefrom in the direction of the axis of the shaft and coöperating therewith to wipe the oil therefrom and return it to said oil well.

3. A bushing of the character specified having a main bearing section and an oil-carrying section through both of which sections a shaft may extend, means whereby oil in the well of the oil chamber may be conveyed to the shaft, and wipers located upon the interior wall of said oil-carrying section and extending inwardly therefrom in the direction of the axis of the shaft and coöperating therewith to wipe the oil therefrom and return it to said oil well.

4. A bushing of the character specified having a main bearing section and an oil-carrying section through both of which sections a shaft may extend, said main bearing section being provided with a groove in the interior thereof having an edge obliquely inclined with respect to the axis of said shaft, means whereby oil in the well of said oil-carrying section may be applied to the shaft, and means located within said oil-carrying section adapted to wipe the oil from said shaft and restore it to said oil-well.

5. A bushing comprising a bearing section and an oil-carrying section, said oil-carrying section being located at one end of said bearing section, said bearing section having a longitudinal groove extending approximately its length, a strip of fibrous material located in said groove, a portion of said material projecting into said oil well, said bearing section also having a groove provided with an edge extending at an oblique angle with respect to the axis of a shaft located within said bushing and between one end of said longitudinal groove and the outer end of said bushing for directing the oil, applied to said shaft by said fibrous material, along said shaft towards the oil-carrying section thereof, and wipers located on the outer wall of said oil-carrying section for wiping the oil from said shaft and returning it to said oil well.

6. A bushing comprising a bearing section having an oil well located at one end thereof, means for preventing the escape of oil from said oil well around a shaft running in said bushing, means for lubricating said shaft comprising a strip of fibrous material located within said bearing, one end of said strip lying in said oil reservoir, and means located between the further end of said strip of fibrous material and the end of said bearing whereby oil carried by said shaft will be prevented from escaping from said bearing, as described.

DANIEL G. LANGLANDS.

Witnesses:
GEORGE O. G. COALE,
ROBERT S. LITTLEFIELD.